United States Patent
Draleau

(10) Patent No.: US 11,142,231 B2
(45) Date of Patent: Oct. 12, 2021

(54) UTILITY HANDCART

(71) Applicant: Dennis Draleau, Lehi, UT (US)

(72) Inventor: Dennis Draleau, Lehi, UT (US)

( * ) Notice: Subject to any disclaimer, the term of this patent is extended or adjusted under 35 U.S.C. 154(b) by 0 days.

(21) Appl. No.: 16/008,925

(22) Filed: Jun. 14, 2018

(65) Prior Publication Data

US 2018/0362059 A1 Dec. 20, 2018

Related U.S. Application Data

(60) Provisional application No. 62/520,873, filed on Jun. 16, 2017.

(51) Int. Cl.
| | | |
|---|---|---|
| *B62B 1/12* | (2006.01) | |
| *B62B 1/00* | (2006.01) | |
| *B62B 5/06* | (2006.01) | |
| *B62B 5/04* | (2006.01) | |

(52) U.S. Cl.
CPC ............. B62B 1/12 (2013.01); B62B 1/006 (2013.01); *B62B 1/008* (2013.01); *B62B 5/0404* (2013.01); *B62B 5/0457* (2013.01); *B62B 5/067* (2013.01); *B62B 2005/0471* (2013.01); *B62B 2205/10* (2013.01); *B62B 2205/24* (2013.01); *B62B 2301/05* (2013.01); *B62B 2301/254* (2013.01)

(58) Field of Classification Search
CPC ........... B62B 1/008; B62B 1/04; B62B 1/042; B62B 1/12; B62B 1/20; B62B 1/202; B62B 1/206; B62B 1/208; B62B 2205/121; B62B 2205/10; B62B 2205/102; B62B 2205/12; B62B 2205/123; B62B 1/006; B62B 2301/05; B62B 5/067

USPC ..................................................... 280/39, 40
See application file for complete search history.

(56) References Cited

U.S. PATENT DOCUMENTS

| | | | | |
|---|---|---|---|---|
| 669,222 | A * | 3/1901 | Ruher | ............................. 280/40 |
| 908,472 | A * | 1/1909 | Lyons | ............................. 280/40 |
| 1,190,399 | A * | 7/1916 | Gates | ............................. 280/40 |
| 1,462,133 | A * | 7/1923 | Glock | ....................... B62B 3/02 |
| | | | | 280/39 |
| 1,523,960 | A * | 1/1925 | Harbison | ............. A47B 3/0912 |
| | | | | 108/127 |
| 2,867,485 | A * | 1/1959 | Schmidt | ............... A47B 3/0912 |
| | | | | 108/131 |

(Continued)

OTHER PUBLICATIONS

Office Action for U.S. Appl. No. 29/695,058, dated Nov. 5, 2020, 7 pages.

(Continued)

*Primary Examiner* — Emma K Frick
(74) *Attorney, Agent, or Firm* — Intellectual Strategies

(57) ABSTRACT

A utility handcart includes a container body, a coupling tube, a handle arm, a collapsing wheel support, an axle, and wheels. The container body is defined by a base panel and sidewalls, The coupling tube is coupled to a bottom of the base panel and includes a hitch receiver on each end of the coupling tube. A first hitch receiver is accessible at a front of the container body, and a second hitch receiver is accessible at a rear of the container body. The handle arm is engaged within a corresponding handle arm passage disposed along one of the sidewalls of the container. The collapsing wheel support is coupled to the container body. The axle is coupled to the collapsing wheel support. The wheels are attached to the collapsing wheel support via the axle.

8 Claims, 11 Drawing Sheets

(56) References Cited

U.S. PATENT DOCUMENTS

| | | | | |
|---|---|---|---|---|
| 2,970,846 | A * | 2/1961 | Boston | B62B 5/0083 280/40 |
| 4,253,677 | A * | 3/1981 | Wissler | B62B 1/208 280/40 |
| 4,609,192 | A * | 9/1986 | Bratcher | A47B 3/083 108/19 |
| 4,733,755 | A * | 3/1988 | Manning | A61G 5/10 188/2 F |
| 5,018,651 | A * | 5/1991 | Hull | B60R 9/06 224/280 |
| 5,186,330 | A * | 2/1993 | McClure | B62B 3/16 206/508 |
| 5,330,212 | A * | 7/1994 | Gardner | B62B 1/20 280/40 |
| 5,673,928 | A * | 10/1997 | Jury | B62B 1/208 280/47.24 |
| D388,580 | S | 12/1997 | Havlovitz | |
| 5,692,761 | A * | 12/1997 | Havlovitz | B62B 1/006 280/33.994 |
| D393,129 | S | 3/1998 | Yemini | |
| 5,876,049 | A * | 3/1999 | Spear | B62B 3/16 280/47.371 |
| 6,164,683 | A * | 12/2000 | Kalman | B60P 3/07 211/17 |
| 6,217,043 | B1 * | 4/2001 | Chumley | B62B 1/125 280/40 |
| 6,283,496 | B1 * | 9/2001 | Dickmann | B62B 1/208 280/40 |
| 6,585,285 | B2 * | 7/2003 | Koch | B62D 63/061 224/924 |
| D487,325 | S | 3/2004 | Nelsen et al. | |
| 6,708,995 | B2 | 3/2004 | Norris | |
| 6,848,695 | B2 * | 2/2005 | Panasewicz | B62B 1/006 206/499 |
| 6,893,030 | B2 * | 5/2005 | Shapiro | B62B 1/206 280/47.34 |
| 7,172,207 | B2 * | 2/2007 | Henry | B60D 1/00 280/40 |
| D544,173 | S | 6/2007 | Mullen et al. | |
| 7,226,072 | B2 * | 6/2007 | Shapiro | B62B 1/206 280/47.33 |
| 7,252,295 | B2 * | 8/2007 | Bludworth | B62B 1/183 280/33.991 |
| D574,121 | S | 7/2008 | Song et al. | |
| D606,565 | S | 12/2009 | Hickenbottom | |
| 7,770,913 | B2 * | 8/2010 | Cannon | B62B 1/12 280/656 |
| 7,963,531 | B2 * | 6/2011 | Panigot | A47C 1/143 280/38 |
| 8,152,179 | B2 * | 4/2012 | Yang | A61G 5/08 280/38 |
| D672,110 | S | 12/2012 | Cooper | |
| 8,505,932 | B1 * | 8/2013 | Piccirillo | B62B 5/0079 280/30 |
| 8,517,411 | B2 * | 8/2013 | Martin | A45C 5/146 280/35 |
| D694,981 | S | 12/2013 | Albert et al. | |
| 8,602,423 | B1 * | 12/2013 | Alexander | B62B 3/165 280/30 |
| 9,371,080 | B2 * | 6/2016 | Dilone, Jr. | B62B 1/125 |
| 9,446,777 | B2 * | 9/2016 | Umbro | B62B 1/12 |
| 10,232,867 | B1 * | 3/2019 | Jones | B62B 3/1404 |
| D851,352 | S | 6/2019 | Dror | |
| D876,744 | S | 2/2020 | Wernberg et al. | |
| D885,701 | S | 5/2020 | Draleau | |
| D892,425 | S | 8/2020 | Bresnahan et al. | |
| 2004/0232660 | A1 * | 11/2004 | Chen | B62B 3/02 280/651 |
| 2006/0207831 | A1 * | 9/2006 | Moore | A01M 31/006 182/20 |
| 2009/0146394 | A1 * | 6/2009 | Seivert | B60R 9/06 280/504 |
| 2009/0212515 | A1 * | 8/2009 | Oyasaeter | B62D 63/062 280/40 |
| 2010/0066069 | A1 * | 3/2010 | Bradshaw | B60R 9/06 280/769 |
| 2012/0187662 | A1 * | 7/2012 | Riddiford | B62B 1/008 280/652 |
| 2015/0203018 | A1 * | 7/2015 | Dechant | B60P 1/16 280/30 |
| 2017/0174112 | A1 * | 6/2017 | Sadinski | B62B 3/16 |
| 2017/0297596 | A1 * | 10/2017 | Ertel | B62B 1/208 |

OTHER PUBLICATIONS

Office Action for U.S. Appl. No. 29/695,061, dated Nov. 5, 2020, 7 pages.
Office Action for U.S. Appl. No. 29/695,062, dated Nov. 5, 2020, 7 pages.
"All-Terrain Utility Cart Polymule" available at: https://polymule.com/shop?olsPage=products%2Fpolymule-utility-cart-ply-ttt-crt1, (Nov. 2, 2020), 1 page.
Notice of Allowance for U.S. Appl. No. 29/695,058, dated Mar. 1, 2021, 5 pages.
Notice of Allowance for U.S. Appl. No. 29/695,061, dated Mar. 1, 2021, 5 pages.
Notice of Allowance for U.S. Appl. No. 29/695,062, dated Mar. 1, 2021, 5 pages.

* cited by examiner

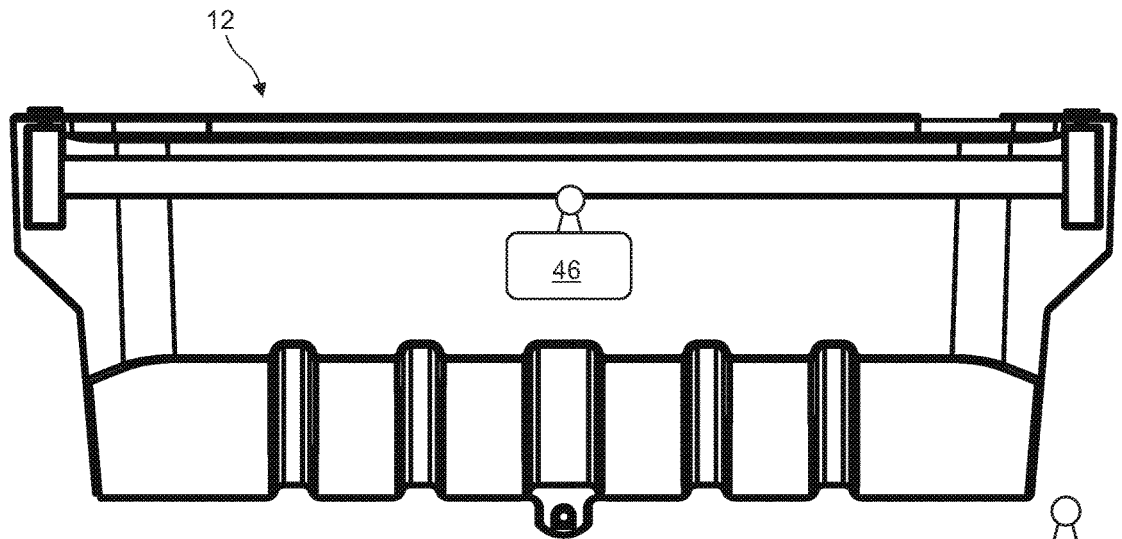
FIG. 6
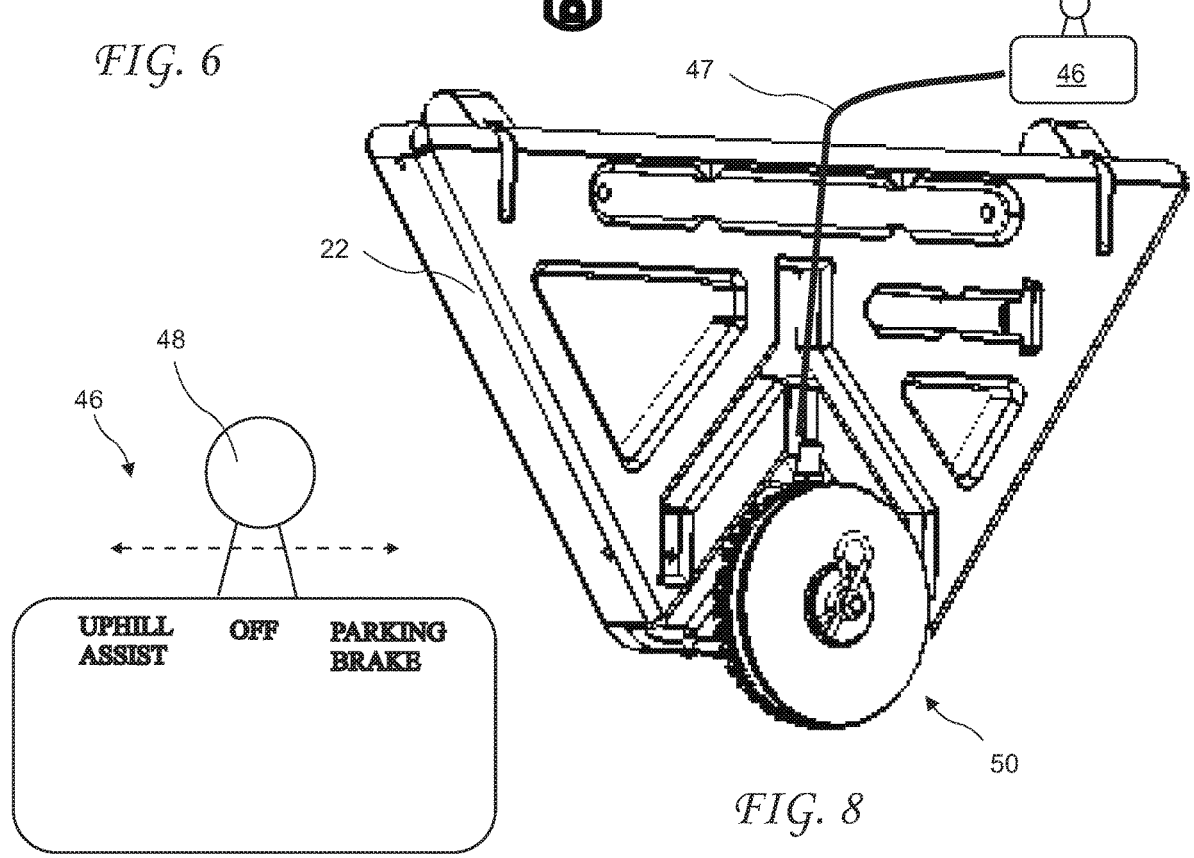
FIG. 7
FIG. 8

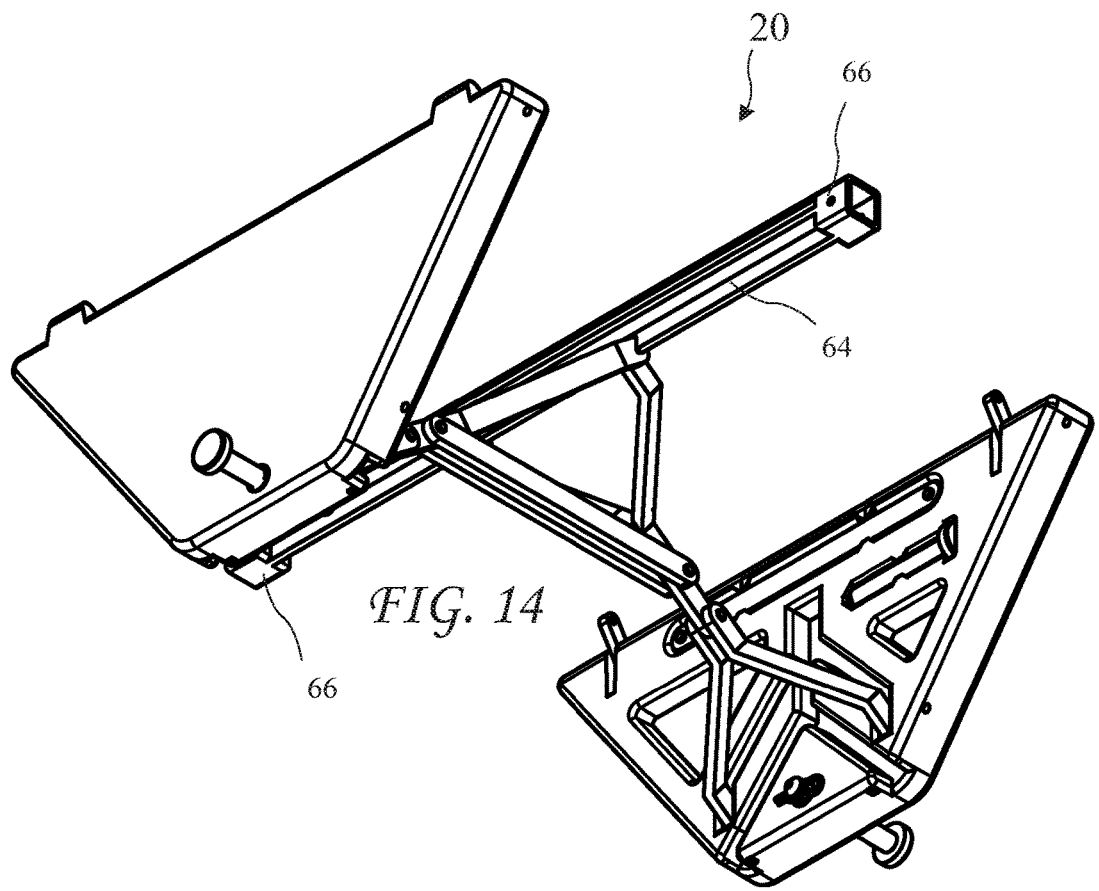
FIG. 14
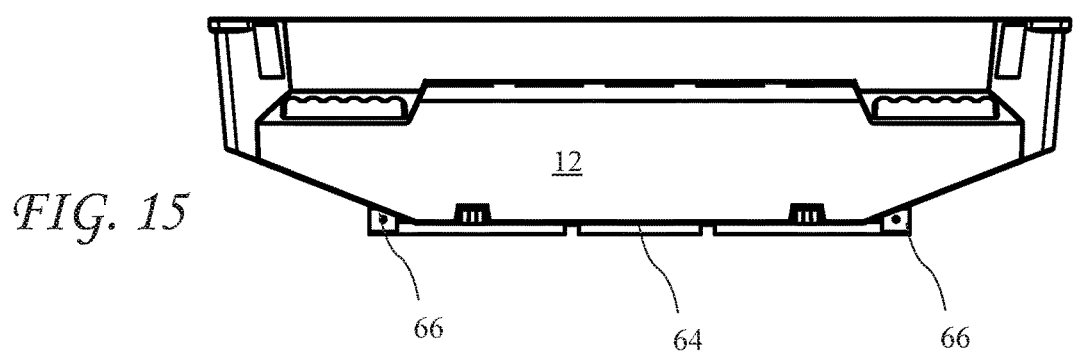
FIG. 15
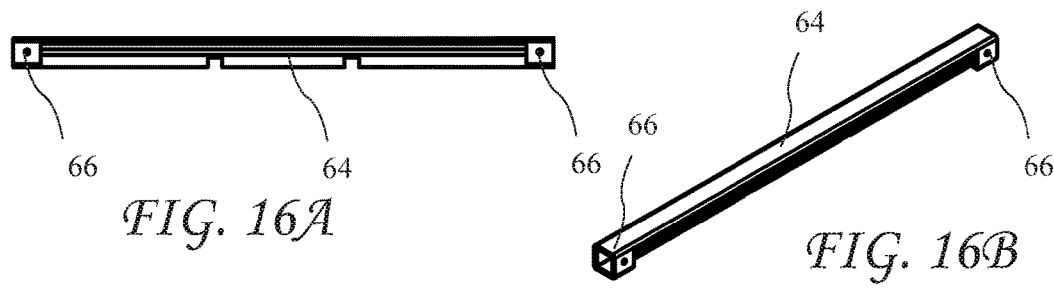
FIG. 16A
FIG. 16B

UTILITY HANDCART

CROSS-REFERENCE TO RELATED APPLICATIONS

The present application claims the priority of U.S. Provisional Patent Application Ser. No. 62/520,873 filed Jun. 16, 2017, which application is incorporated in its entirety herein by reference.

BACKGROUND OF THE INVENTION

The present invention relates to carts and in particular to handcarts for deployment in humanitarian aid operations.

In the event of natural or man made disasters, vehicles may not always be available or feasible for use in certain cases, due to limited availability or limited resources, remote locations, off-road conditions, thick foliage, or rough terrain. As a result it is often necessary to transport materials, equipment, goods, supplies, animals, or even people from one location to another using wheelbarrows, various utility carts, garden carts, and the like. However, wheelbarrows, utility carts, and garden carts, are often not feasible for use over long distances or rough terrain due to limitations in ground clearance, durability, stability, longevity, and capacity. Also, as a result of poor ergonomics, excessive human energy is required for transporting loads on these types of carts. Additionally, "packing in" various items in a backpack limits the amount and the type of items that can be carried, and places burden directly upon the body.

Known wooden pioneer handcarts lack durability, stability, and longevity due to limitations of wood, high rolling resistance due to rudimentary wheels and bearings, and a design that requires frequent service and maintenance. These old designs were difficult to load, as they had no integrated kickstands. Such utility carts were not easily transportable and frequently require the use of tools for assembly.

Known modern utility carts are poorly adapted for rough terrain and often do not provide durability, stability, or optimal ergonomics. Furthermore, they lack human energy savings, simple tool-less assembly and disassembly, easy stowing and transporting, ground-clearance, or integrated kickstand mechanisms.

BRIEF SUMMARY OF THE INVENTION

The present invention addresses the above and other needs by providing a utility handcart for transporting equipment, materials, goods, supplies, animals, and people during or after a natural or man made disaster. The handcart includes a solid body and integrated body/frame design increasing its durability to withstand constant use over long distances on rough terrain. An ergonomic placement of side-rails, adjustable height, and low rolling resistance through use of modern no-flat wheels with precision bearings, eases burdens and energy demands which are placed on humans when transporting various items. Materials are selected to reduce or eliminate regular service or maintenance. A kickstand aids the loading and unloading of the handcart, and positions the handcart ready for use. A ratcheting uphill assist prevents rolling backwards. The handcart may be assembled or disassembled without tools and components compactly arrange for storing and transporting.

In accordance with one aspect of the invention, there is provided a utility cart having a solid body and integrated body/frame design which increases durability to withstand consistent use over long distances on rough terrain. An ergonomic placement of side-rails, adjustable height, and low rolling resistance through use of modern no-flat wheels with precision bearings, eases burdens and energy demands which are placed on humans when transporting items. Materials are selected to reduce or eliminate the need for regular service or maintenance. The utility cart may be assembled or disassembled without tools, and when disassembled, is compactly stored or transported. An integrated kickstand mechanism aids the loading and unloading of the handcart and allows easy access to an operator position.

In accordance with another aspect of the invention, there is provided a modern, durable, and impact resistant handcart with large diameter wheels that can carry several cubic feet of items and traverse long distances. With a high-clearance design and precision bearings, the handcart can comfortably traverse in remote areas or on rough terrain. The handcart is designed for both longevity and to optimize human energy expenditure and ergonomics. The handcart is easily stowable and transportable and utilizes a tool-less assembly.

In accordance with yet another aspect of the invention, there is provided a handcart including a combined handle and kickstand. The handle includes arms having pivot joints providing a handle position with the arms straight and a kickstand position with the arms bent down. The arms are further retractable into the handcart body for storage and transportation.

In accordance with yet another aspect of the invention, there is provided a handcart including an uphill assist mechanism. The uphill assist mechanism is an engagable ratcheting mechanism, which prevents the handcart from rolling backwards on a hill. The uphill assist mechanism may further include a brake function locking the wheels, and may add rolling resistance to slow downhill descent.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 6 is a front view of the handcart body showing a wheel control according to the present invention.

FIG. 7 shows a detailed view of the wheel control according to the present invention.

FIG. 8 shows a wheel control assembly according to the present invention attached to a strut.

FIG. 14 shows a perspective view of the wheel support and the coupling tube and hitch receivers according to the present invention.

FIG. 15 shows a side view of the handcart body, coupling tube and hitch receivers according to the present invention.

FIG. 16A shows a side view of the coupling tube and hitch receivers according to the present invention.

FIG. 16B shows a perspective view of the coupling tube and hitch receivers according to the present invention.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement.

Figure 1:
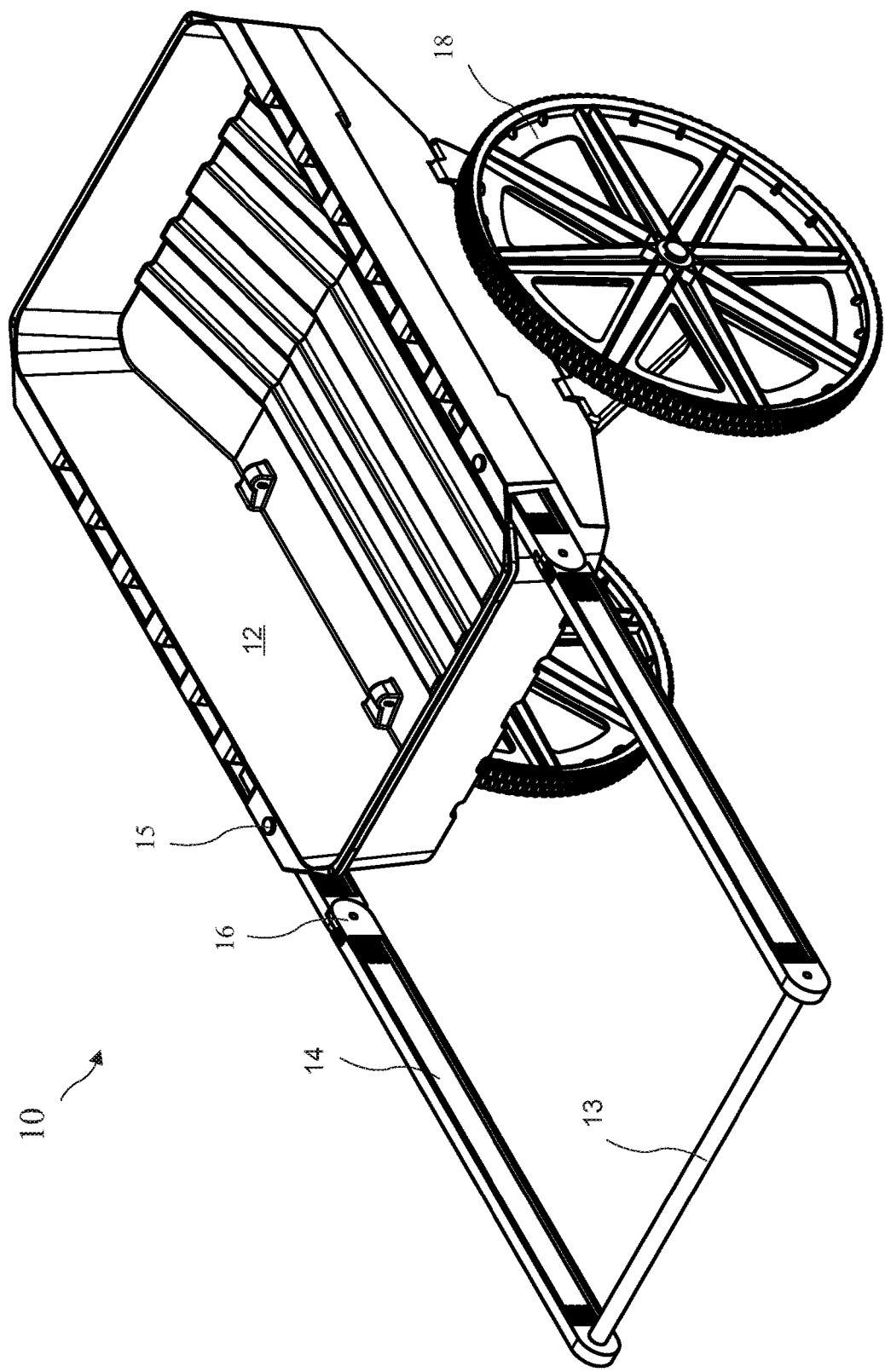
FIG. 1 is top perspective view of a handcart according to the present invention.
Figure 2:
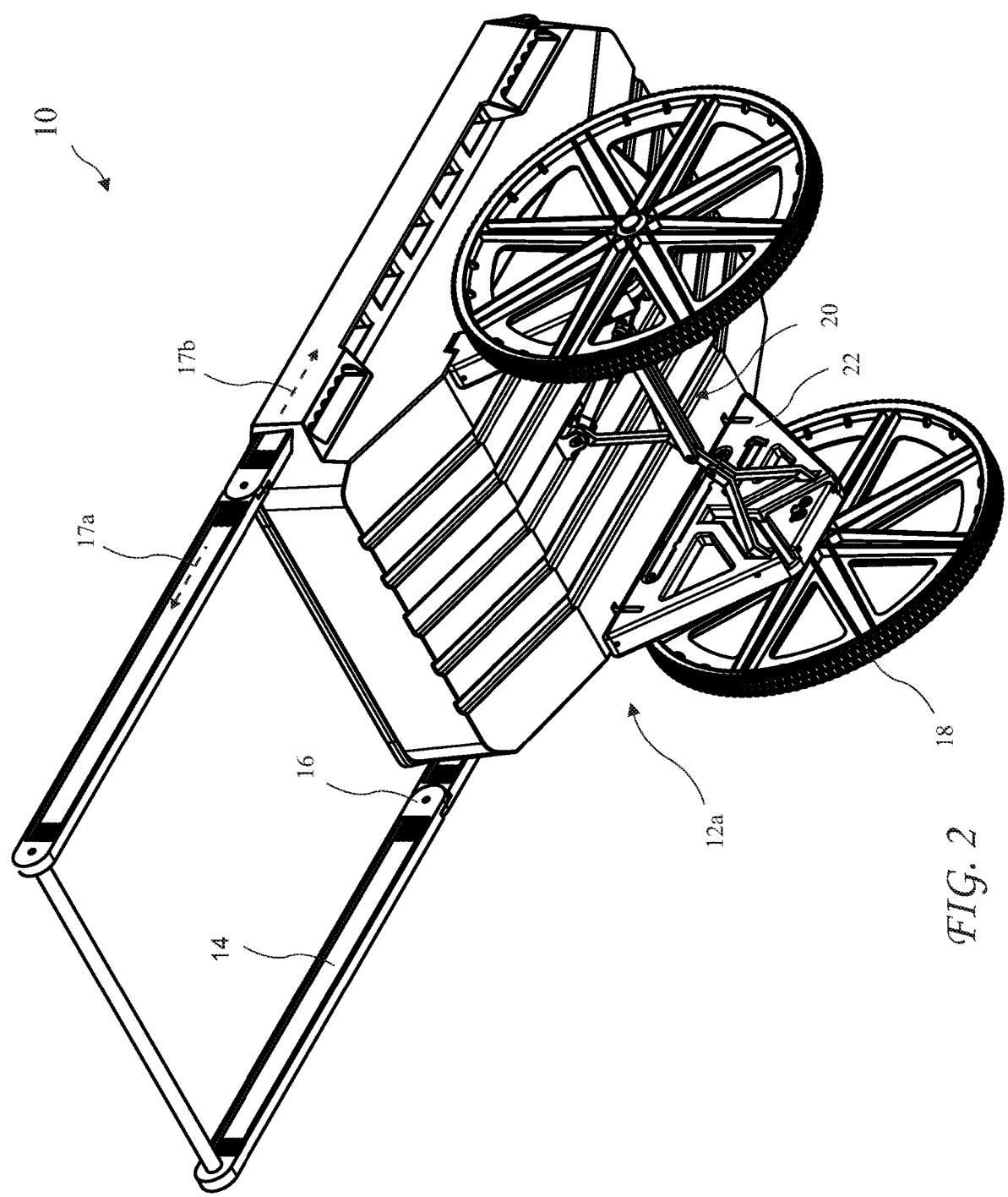
FIG. 2 is bottom perspective view of the handcart according to the present invention.

A top perspective view of a handcart 10 according to the present invention is shown in FIG. 1 and a bottom perspective view of the handcart 10 is shown in FIG. 2. Arms 14 are extendable along arrow 17a and retractable along arrow 17b into a body 12 when arm releases 15 are depressed. Joints 16 allow the arms 14 to pivot forward to provide a handle 13 for moving the handcart 10, and allow the arms 14 to be pivoted downward to provide a kickstand for the handcart 10 when stationary. The handcart 10 is supported by wheels 18. The wheels 18 are preferably between 19 and 48 inches in diameter and preferably include run-flat or no-flat tires. The wheels 18 are attached to folding struts 22 supported by a collapsing wheel support 20 (also see FIGS. 3, 4A and 4B).

Figure 3:
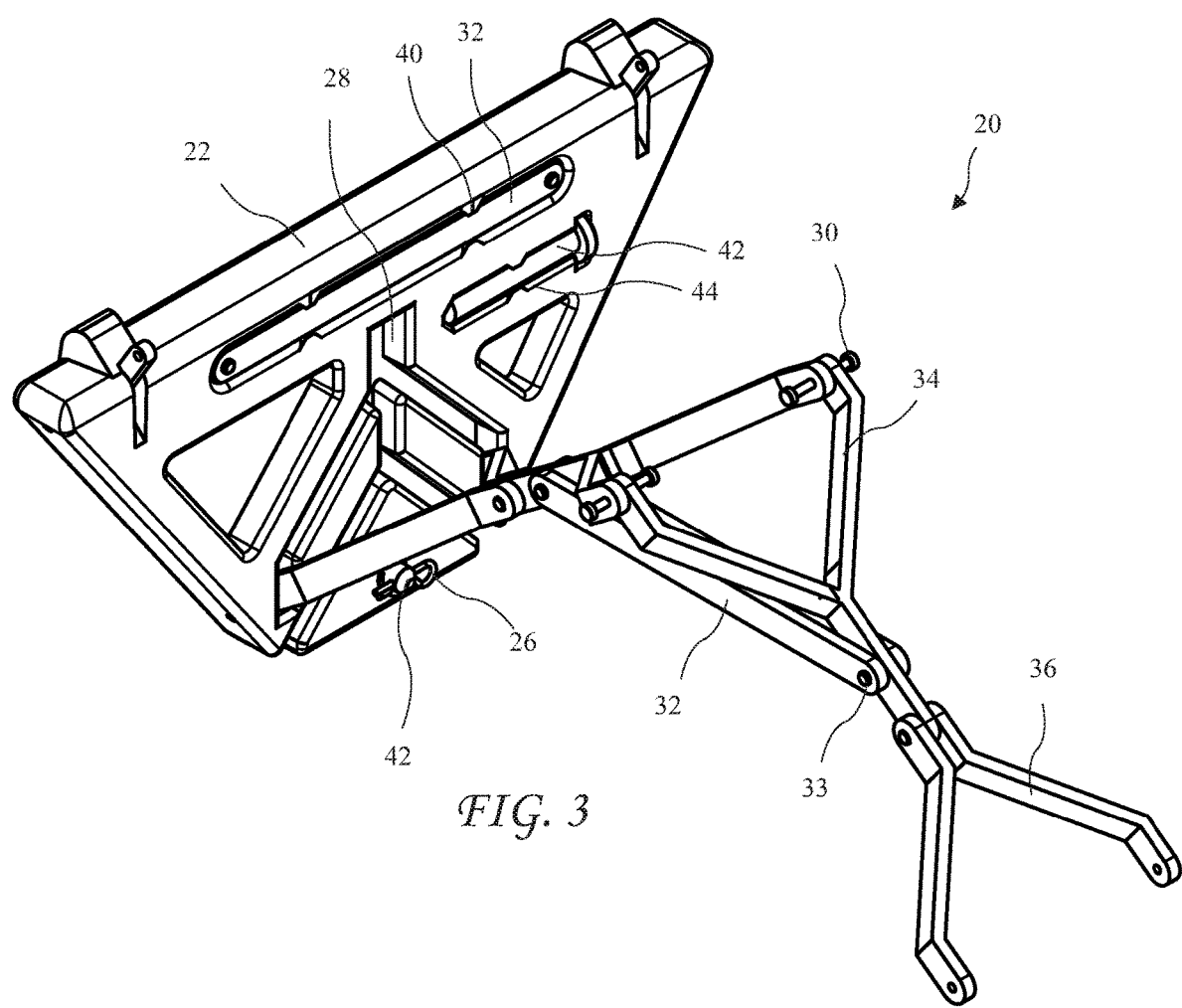
FIG. 3 shows a collapsing wheel support according to the present invention.
Figure 4A:
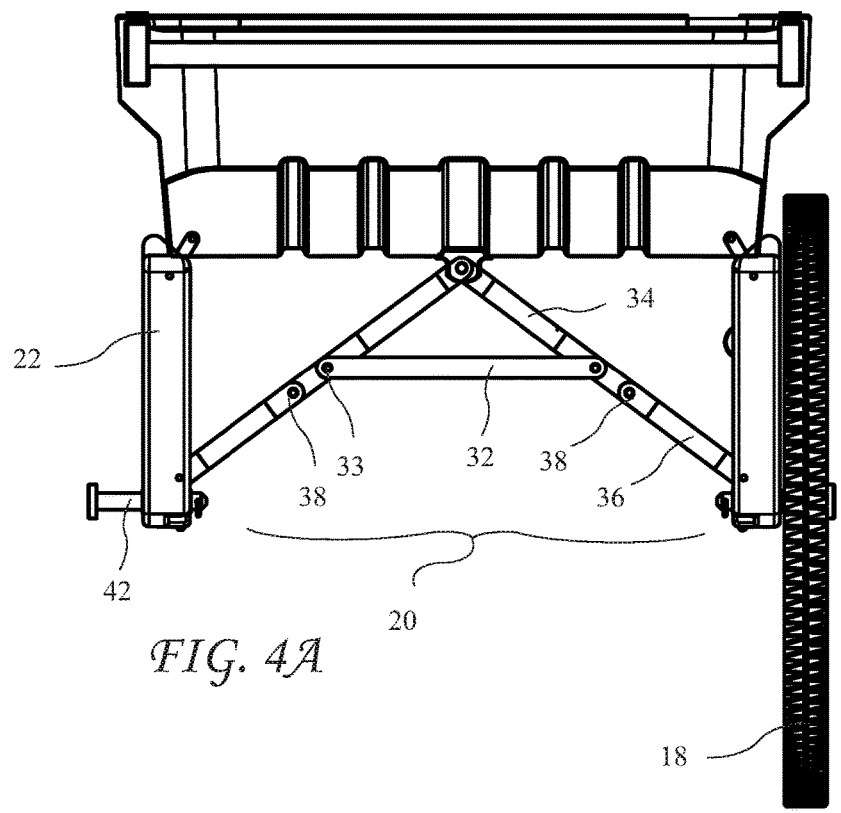
FIG. 4A shows the collapsing wheel support extended according to the present invention with one wheel attached.
Figure 4B:
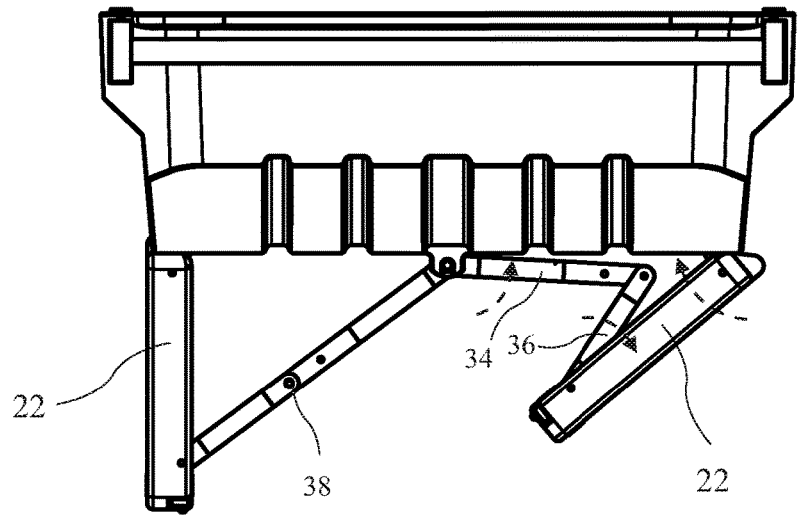
FIG. 4B shows the collapsing wheel support partially collapsed according to the present invention.

A collapsing wheel support 20 is shown in FIG. 3, the collapsing wheel support 20 extended with one wheel attached is shown in FIG. 4A, and the collapsing wheel support 20 with one side partially closed is shown in FIG. 4B. The folding struts 22 and collapsing assembly 20 including a horizontal brace 32, diagonal strut supports comprising upper yokes 34 and lower yokes 36. The brace 32 is attached to the yokes 34 by pins 33 which are preferably self-locking cotter pins. The upper yokes 34 pivot about a yoke pin 30 attached to the bottom 12a (see FIG. 2) of the body 12.

The brace 32 is detached and the struts 22 pivot up against the bottom 12a, while the yokes 34 and 36 pivot about a yoke pin 38 to overlap and rest in a yoke recess 28 in the struts 22. Axles 42 may also be stored in axle recesses 44 in the struts 22. Braces 32 may also be stored in the brace recesses 40 in the struts 22. The struts 22 engage clips on the bottom 12a of the body 12 to retain the struts in the folded position. The handcart 10 may be assembled and disassembled without tools using the pins 33 and wheel clips 26. The wheels 18 are held by the axles 42, and the axles 42 are retained to the struts 22 by wheel clips 26.

Figure 5:
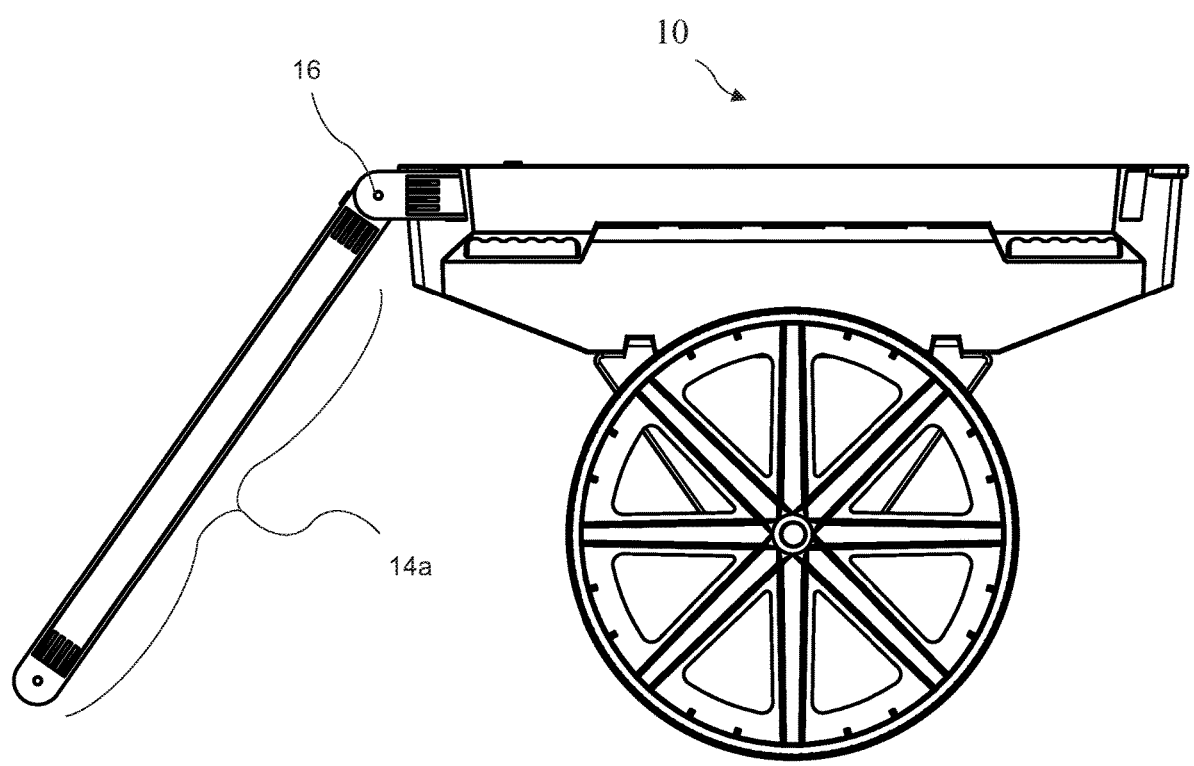
FIG. 5 shows a side view of the handcart according to the present invention with handle arms pivoted down to provide a kickstand.

FIG. 5 shows a side view of the handcart 10 with outer portions 14a of the handle arms 14 pivoted down around the joints 16 to provide a kickstand for the handcart 10. The joints also provide intermediate positions of the handle arms 14 for individual users and for use on slopes to keep the body 12 of handcart 10 horizontal.

A wheel motion control 46 is shown attached to the front of the body 12 in FIG. 6 and a detailed view of the wheel control 46 controlled by, for example, a cable 47, for example, a common external cable braking assembly, moved by the wheel control lever 48, is shown in FIG. 7. The wheel control 46 has 3 positions, UPHILL ASSIST, OFF, AND PARKING BRAKE.

Figure 9A:
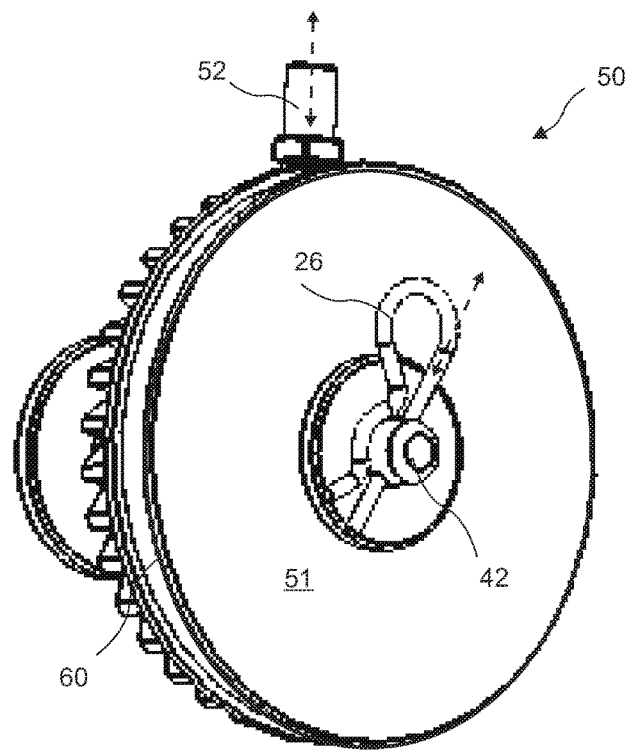
FIG. 9A shows an inside view of the wheel control assembly according to the present invention.
Figure 9D:
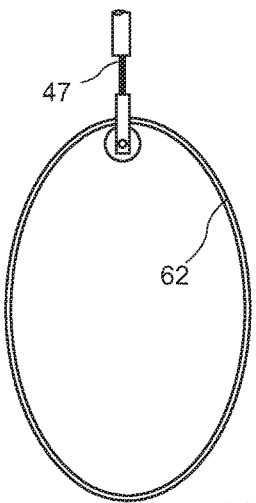
FIG. 9D shows a belt of the wheel control assembly according to the present invention.
Figure 9C:
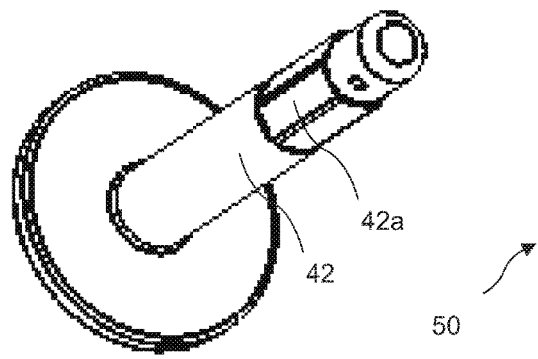
FIG. 9C shows an axle of the wheel control assembly according to the present invention.
Figure 9B:
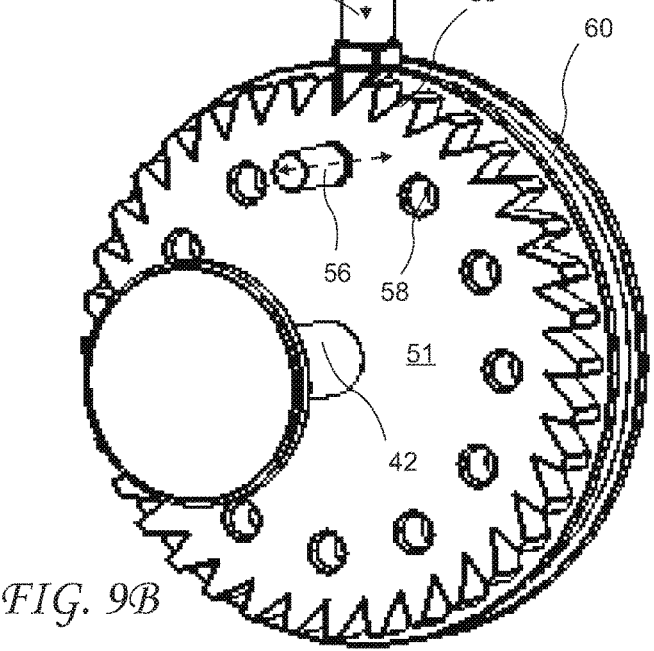
FIG. 9B shows an outside view of the wheel control assembly according to the present invention.

FIG. 8 shows a wheel control assembly 50 attached to a strut 22, FIG. 9A shows an inside view of the wheel control assembly 50, FIG. 9B shows an outside view of the wheel control assembly 50, FIG. 9C shows the axle 42 used with the wheel control assembly 50, and FIG. 9D shows a belt 62 of the wheel control assembly 50. The axle 42 includes an indexing portion 42a, for example a hexagonal portion, to rotationally couple a control hub 51 to the wheel 18. The control hub 51 is held on the axle 42 by the wheel clip 26. The wheel control assembly 50 includes a ratcheting mechanism comprising a spring 52a loaded cog 52 which engages teeth 53 surrounding the control hub 51 when the wheel motion control 46 is in the uphill assist position, preventing the handcart 10 from rolling backwards. A hub lock pin 56 engages holes 58 in control hub 51 when the wheel motion control 46 is fully in the parking brake position to lock the wheels 18. With use of, for example, the cable 47 (see FIG. 8), the belt 62 engages a belt groove 60 around the control hub 51 to produce friction creating drag on the wheels 18, for example, when going down hill. The belt 62 and belt groove 60 may be replaced by other friction elements, for example brake shoes pressed against the control hub 51.

Figure 10:
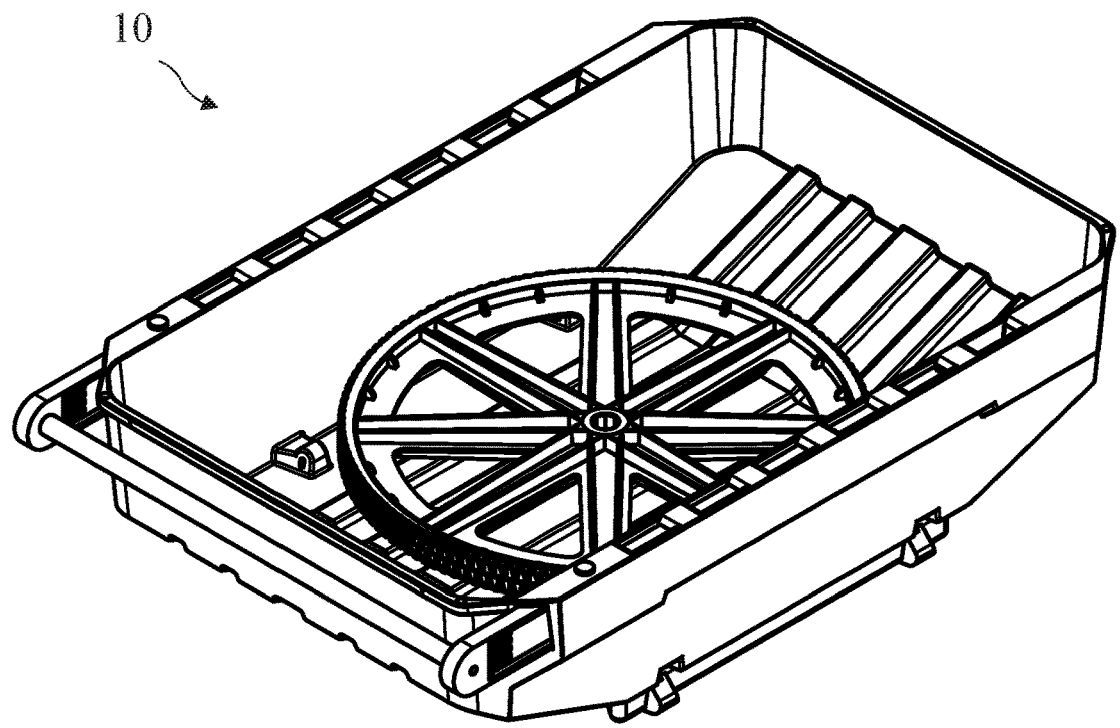
FIG. 10 shows a top perspective view of the handcart according to the present invention with the wheel removed and stored in the handcart, and the wheel supports collapsed.

FIG. 10 shows a top perspective view of the handcart 10 with the wheels 18 removed and stored in the body 12 of the handcart 10, and the wheel supports 20 collapsed and the struts 22 folded.

Figure 11:
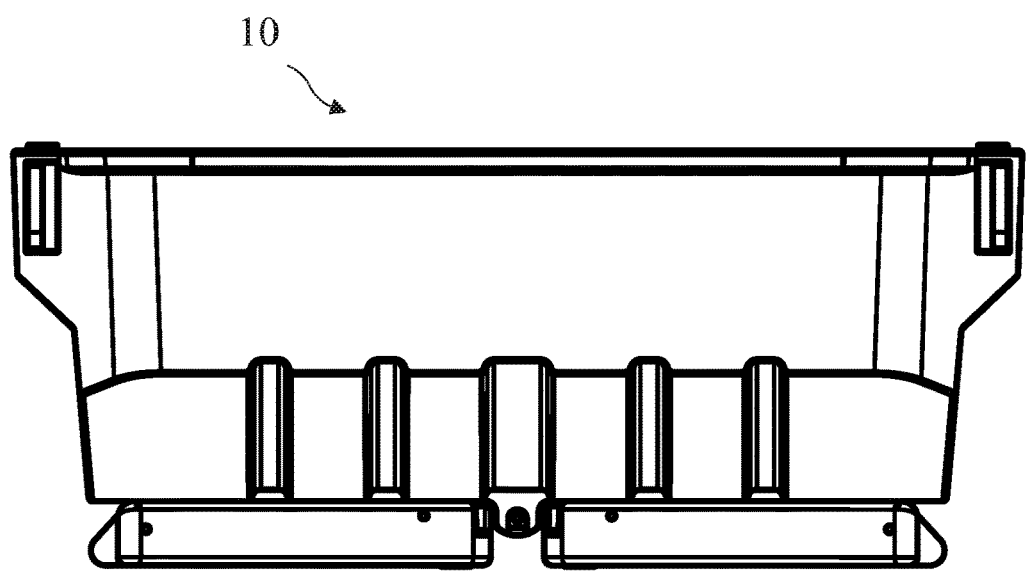
FIG. 11 shows an end view of the handcart according to the present invention with the wheels removed and the wheel supports collapsed.

FIG. 11 shows an end view of the handcart 10 with the wheels 18 removed and the wheel supports 20 collapsed and the struts 22 folded.

Figure 12:
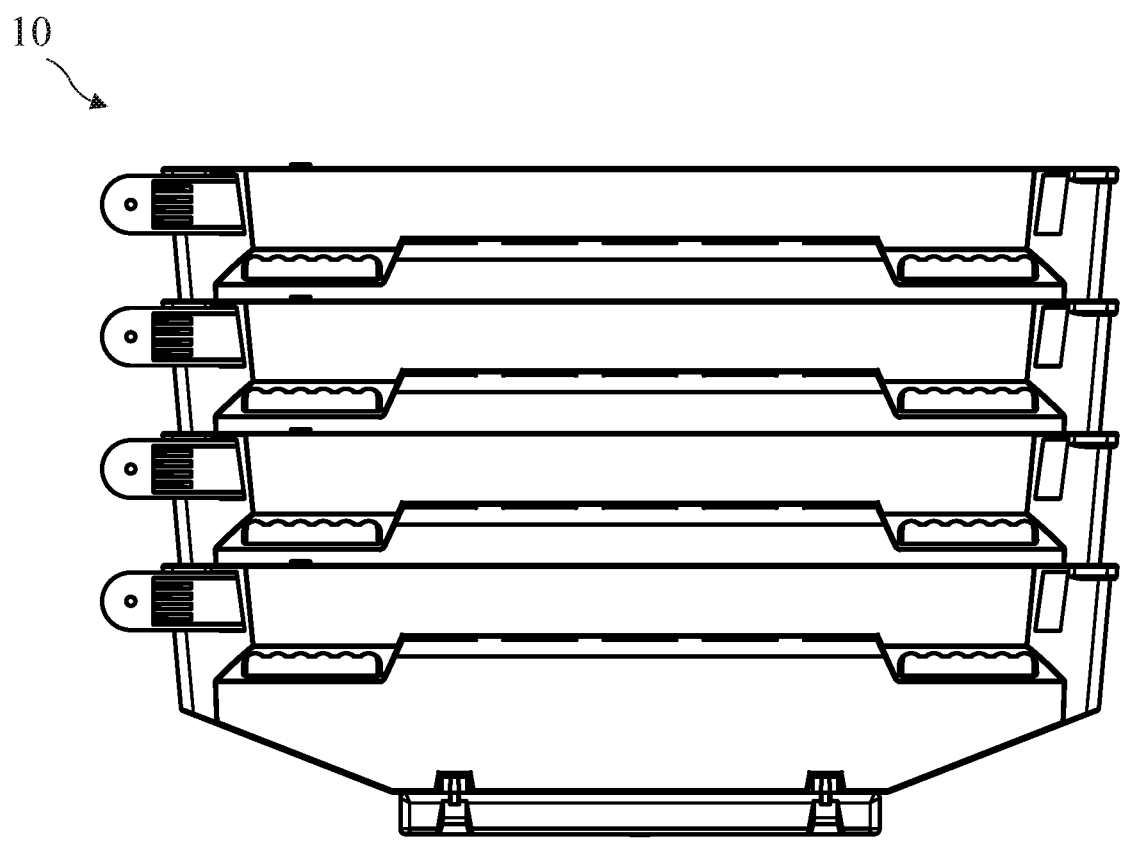
FIG. 12 shows a side view of collapsed handcarts stacked for storage or transport.

FIG. 12 shows a side view of collapsed handcarts 10 stacked for storage or transport.

Figure 13A:
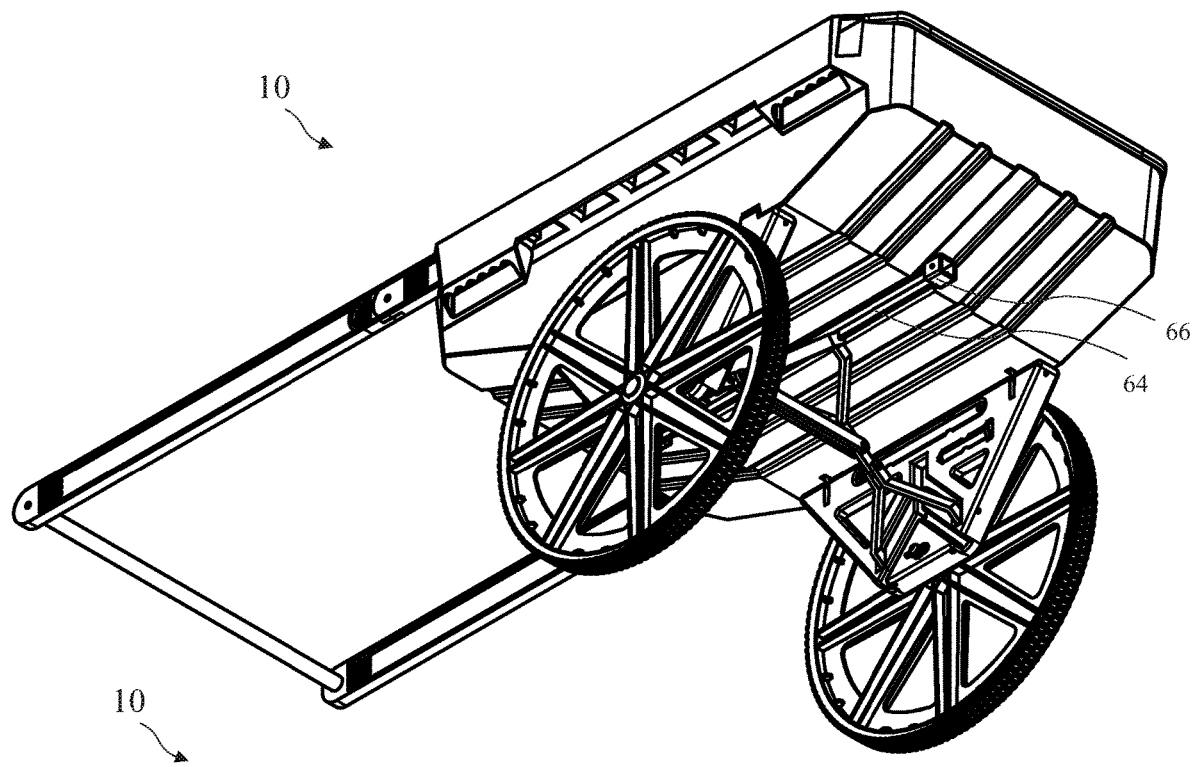
FIG. 13A shows a bottom perspective view of the handcart including a coupling tube and hitch receivers according to the present invention.
Figure 13B:
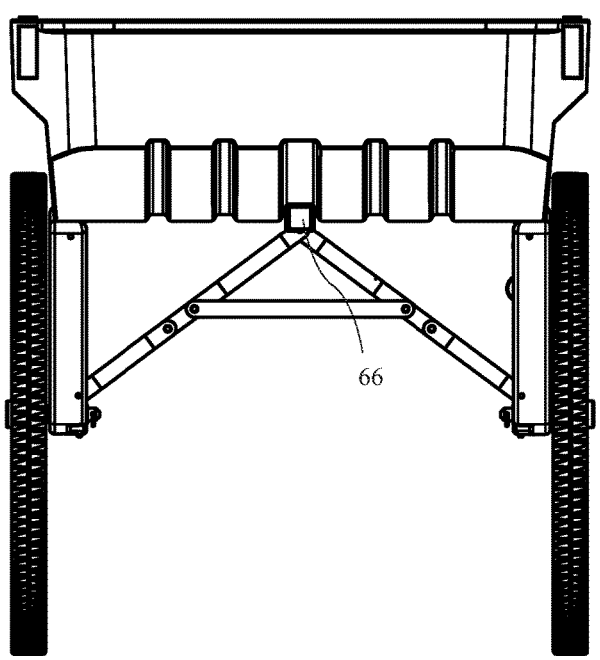
FIG. 13B shows a rear view of the handcart including the hitch receiver according to the present invention.

FIG. 13A shows a bottom perspective view of the handcart 10 including a coupling tube (or beam) 64 and hitch receivers 66 and FIG. 13B shows a rear view of the handcart 10 including the hitch receiver 66. The hitch receivers 66 are preferably a common 1.25 inch hitch, but may be any hitch capable of receiving a trailer coupling, for example, capable of receiving a trailer hitch ball and mount or a trailer coupling configured to receive a trailer hitch ball. The hitch receivers 66 allow handcarts 10 to be coupled to form a convoy of handcarts. The coupling tube 64 further adds strength and payload capacity to the handcart 10. The coupling tube 64 is preferably molded into the body 12, but may be bolted to the body 12.

FIG. 14 shows a perspective view of the collapsing wheel support 20 and the coupling tube 64 and hitch receivers 66 at both ends of the coupling tube 64.

FIG. 15 shows a side view of the handcart body 12 and coupling tube 64 and hitch receivers 66 attached to the bottom of the body 12.

FIG. 16A shows a side view of the coupling tube 64 and hitch receivers 66 and FIG. 16B shows a perspective view of the coupling tube 64 and hitch receivers 66.

While the invention herein disclosed has been described by means of specific embodiments and applications thereof, numerous modifications and variations could be made thereto by those skilled in the art without departing from the scope of the invention set forth in the claims.

I claim:

1. A handcart, comprising:
a container body defined by a base panel and sidewalls;
a coupling tube coupled to a bottom of the base panel, wherein the coupling tube further comprises a hitch receiver on each end of the coupling tube, with a first hitch receiver accessible at a front of the container body, and a second hitch receiver accessible at a rear of the container body;
at least one handle arm engaged within a corresponding handle arm passage disposed along one of the sidewalls of the container body, wherein the at least one handle arm comprises a first section aligned with the handle arm passage and a second section pivotally connected to a distal end of the first section, and the second section of the at least one handle arm configured to pivot downward to engage the ground and form a stand for the handcart when the handcart is stationary;
a single pair of wheels, the pair of wheels being in general alignment with each wheel rotatably attached to the container body by a wheel strut, and wherein at least one wheel strut is movable between a rolling position and a collapsed position;
wherein the at least one wheel strut is foldable against the bottom of the container body, when the at least one wheel strut is in the collapsed position; and
strut supports to attach to the wheel struts and position the wheel struts in the rolling position for operation of the wheels, wherein the strut supports comprise folding upper and lower yokes attached between the container body and the at least one wheel strut, and the upper and lower yokes are further configured to fold into an overlapping position within recesses in the at least one wheel strut in a storage position.

2. The handcart of claim 1, wherein the base panel comprises three sections, including a central section, a first sloped section sloping upward from the central section, and a second sloped section sloping upward from the central section, wherein the first and second sloped sections are disposed on opposite sides of the central section.

3. The handcart of claim 2, wherein a plurality of structural ribs span the central section and at least portions of both the first and second sloped sections.

4. The handcart of claim 1, further comprising a multi-functional control hub coupled to at least one wheel axle, wherein the control hub is configured to engage a parking mechanism to prevent rotation of the at least one wheel axle in an engaged position.

5. A handcart, comprising:
a container body defined by a base panel and sidewalls;
at least one handle arm engaged within a corresponding handle arm passage disposed along one of the sidewalls of the container body, wherein the at least one handle arm comprises a first section aligned with the handle arm passage and a second section pivotally connected to a distal end of the first section, and the second section of the at least one handle arm configured to pivot downward to engage the ground and form a stand for the handcart when the handcart is stationary;
a pair of aligned wheels, wherein each wheel is rotatably attached to the container body by a wheel strut, and wherein at least one wheel strut is movable between a rolling position and a collapsed position;
wherein the at least one wheel strut is foldable against the bottom of the container body, when the at least one wheel strut is in the collapsed position; and
strut supports to attach to the wheel struts and position the wheel struts in the rolling position for operation of the wheels, wherein the strut supports comprise folding upper and lower yokes attached between the container body and the at least one wheel strut, and the upper and lower yokes are further configured to fold into an overlapping position within recesses in the at least one wheel strut in a storage position.

6. The handcart of claim 5, wherein the base panel comprises three sections, including a central section, a first sloped section sloping upward from the central section, and a second sloped section sloping upward from the central section, wherein the first and second sloped sections are disposed on opposite sides of the central section.

7. The handcart of claim 6, wherein a plurality of structural ribs span the central section and at least portions of both the first and second sloped sections.

8. The handcart of claim 5, further comprising a coupling tube coupled to a bottom of the base panel, wherein the coupling tube further comprises at least one hitch receiver on an end of the coupling tube.

* * * * *